US008443659B2

(12) United States Patent
Mistral et al.

(10) Patent No.: US 8,443,659 B2
(45) Date of Patent: May 21, 2013

(54) FASTENER TOOL FOR FASTENING A TRANSMISSION SHAFT, AND A BALANCING BENCH INCLUDING SUCH A TOOL

(75) Inventors: Lucien Mistral, Chateaneuf les Martigues (FR); Philippe Hollier-Larousse, Bouc Bel Air (FR)

(73) Assignee: Eurocopter, Marignane Cedex (FR)

( * ) Notice: Subject to any disclaimer, the term of this patent is extended or adjusted under 35 U.S.C. 154(b) by 622 days.

(21) Appl. No.: 12/667,083

(22) PCT Filed: May 6, 2008

(86) PCT No.: PCT/FR2008/000656
§ 371 (c)(1),
(2), (4) Date: Mar. 25, 2010

(87) PCT Pub. No.: WO2009/004129
PCT Pub. Date: Jan. 8, 2009

(65) Prior Publication Data
US 2011/0047711 A1    Mar. 3, 2011

(30) Foreign Application Priority Data
Jul. 2, 2007  (FR) ...................... 07 04743

(51) Int. Cl.
*G01M 13/02*    (2006.01)
(52) U.S. Cl.
USPC .................... 73/115.02; 73/116.04

(58) Field of Classification Search
USPC ...................................... 73/115.02
See application file for complete search history.

(56) References Cited

U.S. PATENT DOCUMENTS

| 4,727,828 | A  | * | 3/1988  | Ueno et al. ................. 123/2 |
| 5,022,276 | A  |   | 6/1991  | Thelen |
| 6,810,733 | B2 | * | 11/2004 | Fischer ....................... 73/462 |
| 2003/0022720 | A1 | * | 1/2003 | Takei ............................. 464/69 |
| 2005/0005686 | A1 |   | 1/2005 | Oppermann et al. |

FOREIGN PATENT DOCUMENTS
GB    2 356 030    5/2001

OTHER PUBLICATIONS
International Search Report dated Jan. 20, 2009, from corresponding PCT application.

\* cited by examiner

*Primary Examiner* — John Fitzgerald
*Assistant Examiner* — Mark A Shabman
(74) *Attorney, Agent, or Firm* — Brooks Kushman P.C.

(57) ABSTRACT

The present invention relates to a fastener tool (101, 102) for fastening a transmission shaft (1), the tool being arranged at a free end (2, 3) of the transmission shaft (1), and also to a balancing bench (B) including the fastener tool (101, 102). The fastener tool is provided with centering elements (110, 110') for centering the transmission shaft (1), which centering elements are deformable by centrifugal forces so as to come into contact with the transmission shaft as from a determined speed of rotation of the fastener tool (101, 102) about its axis of rotation (AX).

21 Claims, 2 Drawing Sheets

FASTENER TOOL FOR FASTENING A TRANSMISSION SHAFT, AND A BALANCING BENCH INCLUDING SUCH A TOOL

FIELD OF THE INVENTION

The present invention relates to a fastener tool for fastening a transmission shaft, and also to a balancing bench provided with the fastener tool.

More particularly, the invention lies in the technical field of balancing a power transmission shaft, in particular for a rotorcraft.

Most presently-constructed rotorcraft are fitted with at least one turbine engine having a free turbine. Power is then taken from a low pressure stage of the free turbine, which stage is mechanically independent of the assembly comprising the compressor and the high pressure stage of the turbine engine. The free turbine of a turbine engine generally rotates at a speed lying in the range 20,000 revolutions per minute (rpm) to 50,000 rpm, so a gearbox is needed to reduce the speed of rotation for the connection to the main rotor of the rotorcraft, which main rotor having a speed of rotation lying substantially in the range 200 rpm to 400 rpm: this is constituted by the main gearbox.

Under such conditions, the turbine engine is connected to the main gearbox of the rotorcraft via at least one transmission shaft rotating about its axis of rotation at a speed that is high, i.e. at a speed greater than 5000 rpm.

Similarly, a rotorcraft generally has a contra-rotating tail rotor for compensating the torque generated by the main rotor and so as to enable the rotorcraft to be steered in yaw.

Consequently, at least one power transmission shaft is arranged in principle between the main gearbox and a rear gearbox for reducing speed of rotation and for providing an angle takeoff for driving the tail rotor. Such a transmission shaft is also called on to rotate at a speed higher than 5000 rpm.

In order to prevent such transmission shafts from imparting vibration to the rotorcraft during their rotary motion, it is essential for the transmission shafts to be balanced so that their centers of gravity and their central axes of inertia lie on their axes of rotation.

In general, static and dynamic balancing of a rotating body thus consists in positioning its center of gravity and its central axis of inertia on its axis of rotation.

In this context, in order to reduce production costs and the risk of rupture in flight, each transmission shaft is thus placed on a balancing bench, prior to being installed in a rotorcraft, so that an operator can balance it. If the operator observes that the center of gravity and the central axis of inertia of the transmission shaft do not lie on the axis of rotation of the transmission shaft, then the operator adds or removes matter in zones that are provided for this purpose on the transmission shaft in order to balance it and remedy the observed defect.

BACKGROUND OF THE INVENTION

A first balancing bench is known that comprises first and second fastener tools that are set into rotation by a conventional motion generator, e.g. an electric motor.

The operator then places the transmission shaft on the balancing bench by fastening its free ends respectively to the first and second fastener tools, e.g. by using bolts.

When the transmission shaft is in position, the first and second fastener tools are driven in rotation at the required speed.

Conventional balancing means, e.g. including piezoelectric sensors and making use of mathematical principles relating to the Fresnel diagram, then inform the operator when it is necessary to balance the transmission shaft, while also specifying the modifications that need to be implemented.

If modification is required, the operator will generally retouch a portion of the transmission shaft that is provided for this purpose, by removing or adding material so as to enable the center of gravity of the transmission shaft to be positioned on its axis of rotation.

Nevertheless, in order to ensure that balancing is effective and entirely reproducible, it is essential for the transmission shaft to be accurately positioned on the balancing bench.

It will be understood that if it is not accurately positioned, the result obtained will not be optimized. If the transmission shaft is not in a position that is strictly identical to the future position of the transmission shaft, e.g. on board a rotorcraft, then once it has been installed on board the rotorcraft, the transmission shaft will end up by not being balanced.

The balancing bench enables a transmission shaft that is placed in a given position to be balanced, with the balancing means not adapting its data as a function of said position. Any positioning error can therefore lead to catastrophic consequences, since the transmission shaft cannot be properly balanced.

Unfortunately, in order to avoid generating vibration in a rotorcraft, balancing must be extremely accurate, with the center of gravity of the transmission shaft moving through no more than a distance of about 0.015 millimeters (mm) at the most during the balancing procedure.

Consequently, it is impossible to obtain sufficient accuracy with the prior art device having fastener tools that are connected to a transmission shaft by means of bolts.

In addition, even if it is possible to envisage positioning the transmission shaft correctly, that would necessarily be to the detriment of the time taken by the operator to perform that operation, since the operator needs to position the transmission shaft manually with very great care. The profitability of such a device would therefore be greatly reduced insofar as it would take a particularly long time to balance a single transmission shaft.

In addition, it is also essential that the balancing bench is itself balanced, or at least that its fastener tools are. Since the fastener tools are themselves fastened to the transmission shaft, the balancing bench ends up balancing the assembly comprising the fastener tools and the transmission shaft.

Consequently, if the fastener tools are not properly balanced to begin with, then the transmission shaft will not be properly balanced, with any balancing defect in the fastener tools naturally having repercussions on the transmission shaft.

The center of gravity of each fastener tool must therefore lie on its axis of rotation, and the first and second fastener tools must have the same axis of rotation.

To summarize, balancing cannot be performed correctly unless firstly the first and second fastener tools are themselves perfectly balanced and possess a common axis of rotation before the transmission shaft is installed on the balancing bench, and unless secondly the transmission shaft is fastened to the first and second fastener tools in a position that is identical to the position it will have in the rotorcraft.

A second balancing bench is also known that makes use of fastener tools that are arranged inside the free ends of the transmission shaft, and that makes use of fluid bearings.

The fastener tools then present outside diameters that are smaller than the inside diameters of the transmission shaft so as to be capable of being placed inside the transmission shaft. The difference in diameter is then small, on the order of 0.015 mm.

As a general, rule, a fluid bearing consists in forming a film of fluid, of oil or of air, in the space between the outside diameters of the fastener tools and the inside diameters of the transmission shaft. The fluid thus enables each fastener tool to be centered inside the transmission shaft. The transmission shaft is thus correctly and accurately positioned.

In addition, friction between the transmission shaft and the fastener tools is then zero, so it is easy to set the transmission shaft into rotation with the help of jets of air blown against the outside surface of the transmission shaft, e.g. using two diametrically-opposite jets.

Generally, that device is most effective. Nevertheless, when the ratio of the bearing surface divided by the diameter of the free ends of the transmission shaft that is to receive the fastener tool is small, where the bearing surface corresponds to the length of the free end that is suitable for being carried by the fastener tool, then the device is observed to jam.

For example, when said ratio is less than 5%, the fluid bearing does not enable the transmission shaft to be properly centered. At high speed, the transmission shaft then often takes up a wrong position because the fluid film breaks and the shaft jams, thereby preventing balancing from being performed.

In addition, it is difficult to arrange the transmission shaft on the balancing bench since the fluid bearing needs to be sealed, for example. Consequently, it is found to be lengthy and thus expensive in terms of manpower, and also to be relatively fragile.

OBJECT AND SUMMARY OF THE INVENTION

An object of the present invention is to propose a fastener tool that is active and effective regardless of conditions, thereby enabling the limitations of known devices to be overcome. The fastener tool must therefore enable the transmission shaft to be installed quickly and accurately on the balancing bench.

According to the invention, a fastener tool for fastening a transmission shaft is arranged at one free end of the transmission shaft. The invention is remarkable in that the fastener tool is provided with centering means for centering the transmission shaft, which centering means are deformable by centrifugal forces so as to come into contact with said transmission shaft as from a determined speed of rotation of said fastener tool about its axis of rotation, said speed of rotation possibly lying in the range from 2500 rpm to 6000 rpm.

Consequently, the fastener tool, e.g. a rim, adapts itself automatically to the diameter of the transmission shaft by virtue of its centering means. During rotation of the fastener tool, the centrifugal forces acting on said fastener tool deform its centering means, thereby positioning the transmission shaft in the required manner.

The fastener tool is thus robust since it is mechanical only and it enables the transmission shaft to be mounted easily.

Furthermore, the deformation of the centering means is entirely reproducible since it depends solely on the speed of rotation of the fastener tool.

This fastener tool therefore does indeed solve the above-raised problems. Similarly, as explained below, it can also be adapted to shafts that present ends presenting a ratio of bearing surface to diameter that is small.

Advantageously, the fastener tool includes drive means for driving the transmission shaft in rotation. The drive means are provided with at least one finger, preferably with two fingers arranged symmetrically about the axis of rotation of the tool, that co-operate with a bore formed in the transmission shaft so as to drive the transmission shaft in rotation about said axis of rotation of the fastener tool.

Furthermore, a motion generator enables the fastener tool to be set into rotation, and thus enables its drive means and its centering means to be set into rotation.

At low speed, the drive means imparts its rotary motion to the transmission shaft without any assistance. Nevertheless, at high speed, the centrifugal forces deform the centering means sufficiently for them to come into contact with the transmission shaft so as to position it. From that instant, the centering means in turn drive the transmission shaft by friction, with the drive means continuing to contribute to setting the transmission shaft into motion.

In addition, the bore presents a dimension that is greater than the corresponding dimension of the finger so that the transmission shaft can move radially relative to a radius of the finger. More precisely, the bore and the corresponding finger are cylindrical in shape and the bore has a radius that is greater than the radius of the finger.

In this way, the transmission shaft is free to move radially relative to the drive means under pressure from the centering means, thereby enabling it to be properly positioned.

In a variant, it is possible for the drive means to comprise a cylindrical end plate secured to the centering means, said at least one finger thus being fastened to the end plate.

In first and second embodiments, the centering means are arranged inside the transmission shaft.

More precisely, in the first embodiment, the centering means comprise at least two partially-through slots that are identical, each opening out into an outer peripheral face of the centering means.

Each slot is thus blind, with one end of the slot being closed while the other end opens out to the outside of the centering means via its outer peripheral face.

Consequently, since the centering means are circular in profile, each slot is disposed on a chord of the profile.

These slots, or cuts, formed in the centering means enable edges of the centering means to move under the effect of centrifugal forces.

In order to ensure that the positioning of the transmission shaft relative to the fastener tooling is accurate and symmetrical, the slots are distributed uniformly around the outer peripheral face of the centering means.

Although two slots enable satisfactory results to be obtained, it should be observed that is it nevertheless preferable to use at least three slots in order to optimize centering. In addition, the presence of at least three slots makes it possible to avoid creating an unsuitable out-of-balance weight caused by approximate centering.

Furthermore, when the centering means has an even number of slots, the slots are symmetrical in pairs about the center of the profile.

In a second embodiment, the centering means comprise a hollow cylinder with partial radial cuts, i.e. with cuts along radii of the cylinder, so as to present a plurality of identical flyweights each movable under the effect of centrifugal forces.

The cylinder then advantageously has radial grooves that open out in a single outer face of the centering means.

Furthermore, the centering means are provided with an inner zone having a first inside diameter and secured to drive means, the centering means being provided with an outer zone having a second inside diameter and secured to the inner zone, the second diameter being smaller than the first diameter.

Consequently, the free portion of the centering means, i.e. the second zone, is of greater mass than its non-free portion, the first zone, thereby maximizing the effect of centrifugal force.

As a result of these characteristics, the fastener tool in the first embodiment is better adapted to transmission shaft free ends that have a ratio of bearing surface divided by diameter that is small, i.e. less than 5%.

In a third embodiment, the centering means are arranged on the outside of the transmission shaft.

Thus, the centering means are advantageously a ring of constant thickness having at least two flexible blades, preferably at least three flexible blades, that are distributed uniformly relative to one another around the outer periphery of the ring.

Under the effect of centrifugal force, the flexible blades deform and act on the transmission shaft.

Furthermore, the centering means comprise first and second U-shaped openings for defining each flexible blade, the concave sides of the first and second U-shaped openings facing each other. The flexible blade is thus obtained by machining the ring, e.g. using electrochemical machining.

By making the openings in the ring, the flexible blades of the centering means are suitably created.

Furthermore, the first opening is longer than the second opening. A first portion of the flexible blade, the portion lying in the first opening, thus moves under the effect of centrifugal force and drives the second portion of the flexible blade that lies within the second opening. The second portion of each flexible blade thus acts on the transmission shaft in order to position it in the required manner.

Finally, it should be understood that as a function of the shape of the transmission shaft, an operator can firstly make use of a fastener tool of one particular embodiment for fastening a first free end of the transmission shaft, and can secondly make use of a fastener tool of another embodiment for fastening a second free end of the transmission shaft.

The present invention also provides a balancing bench making use of a fastener tool of the invention as described above.

Consequently, a bench for balancing a transmission shaft provided with first and second free ends includes balancing means for informing the operator whether the transmission shaft is properly balanced and for enabling it to be balanced, where necessary.

In addition, the balancing bench has two fastener tools of the invention driven via a motion generator so as to set the transmission shaft into rotation, each fastener tool being arranged at a free end of the transmission shaft.

BRIEF DESCRIPTION OF THE DRAWINGS

The invention and its advantages appear in greater detail in the context of the following description of embodiments given by way of illustration with reference to the accompanying figures, in which.

MORE DETAILED DESCRIPTION

Elements that are shown in more that one of the figures are given the same reference in each of them.

Figure 1:
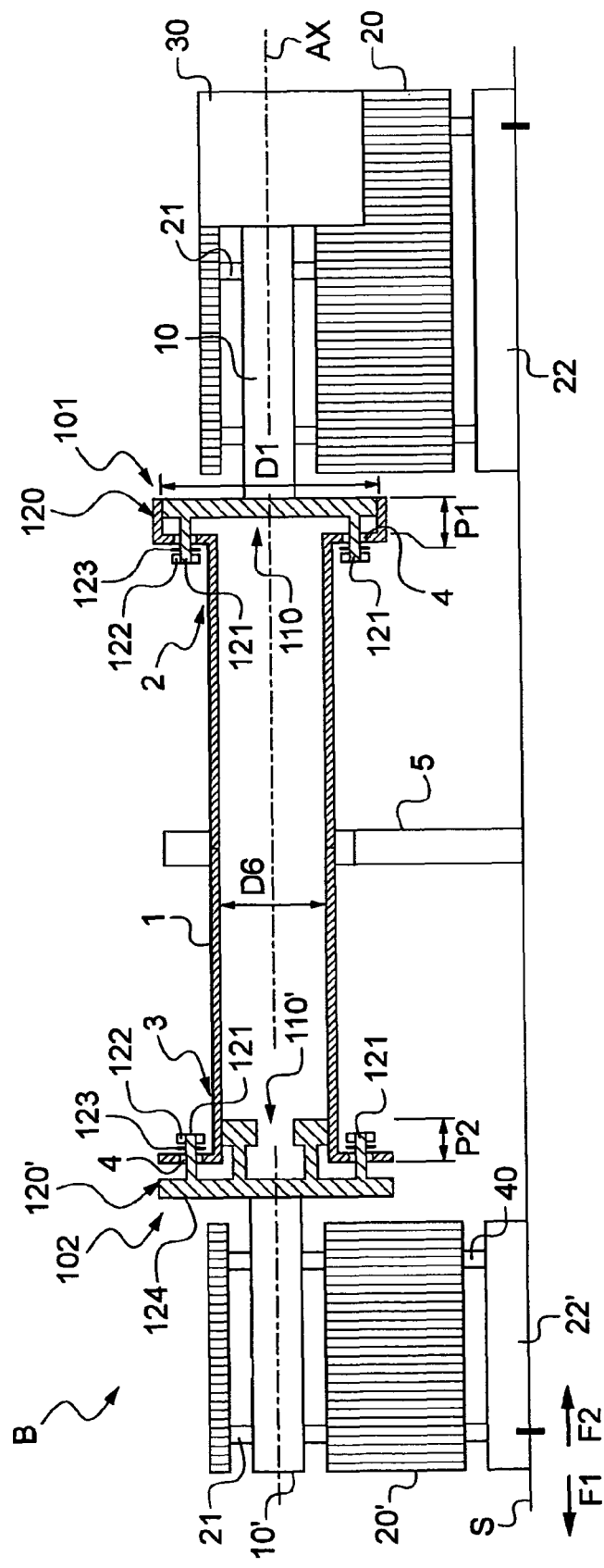
FIG. 1 is a diagrammatic section of a balancing bench.

FIG. 1 shows a balancing bench B of the invention for balancing a transmission shaft 1 having first and second free ends 2 and 3.

The balancing bench has first and second fastener tools 101 and 102 for fastening the transmission shaft 1 for balancing on the balancing bench B.

The first and second fastener tools 101 and 102 are secured respectively to first and second drive shafts 10 and 10' of the balancing bench B that are arranged in first and second structures 20 and 20' of the balancing bench.

In order to be able to perform rotary motion around the axis of rotation AX, said axis also being the axis of rotation of the first and second fastener tools 101 and 102, the balancing bench B is provided with ball bearings 21 located between each of the structures 20, 20' and the corresponding drive shafts 10, 10'.

In addition, the balancing bench B has first and second movable bases 22 and 22' respectively for the first and second structures 20 and 20'. These movable structures 20 and 20' are movable longitudinally, i.e. along the axis of rotation AX of the first and second fastener tools 101 and 102 and of the first and second drive shafts 10 and 10', so as to enable the transmission shaft 1 to be fastened to the fastener tools 101 and 102.

In addition, the balancing bench B is provided with piezo-electric sensors 40 disposed between the first structure 20 and the first base 22 and also between the second structure 20' and the second base 22'.

These sensors 40 are then connected to conventional balancing means (not shown) implementing the theory of the Fresnel diagram in order to determine whether the transmission shaft is balanced.

In order to balance the transmission shaft 1 during a preliminary stage, an operator moves an assembly comprising the second base 22', the second structure 20', the second drive shaft 10', and the second fastener tool 102 longitudinally along arrow F1 so as to fasten an already-balanced transmission shaft 1 to the first fastener tool 101.

The first fastener tool 101 is designed in a first embodiment that is particularly well suited to the free ends of transmission shafts having a small ratio of bearing surface divided by diameter, i.e. less than 5%. This ratio is small in particular for the first free end 2 of the transmission shaft 1, the bearing surface P1 suitable for coming into contact with the centering means 110 of the first fastener tool 101 being small whereas its diameter D1 is relatively large.

Thereafter, the first fastener tool 101 is arranged inside the transmission shaft 1 by being fastened thereto with the help of centering means 110 and drive means 120.

Figure 2:
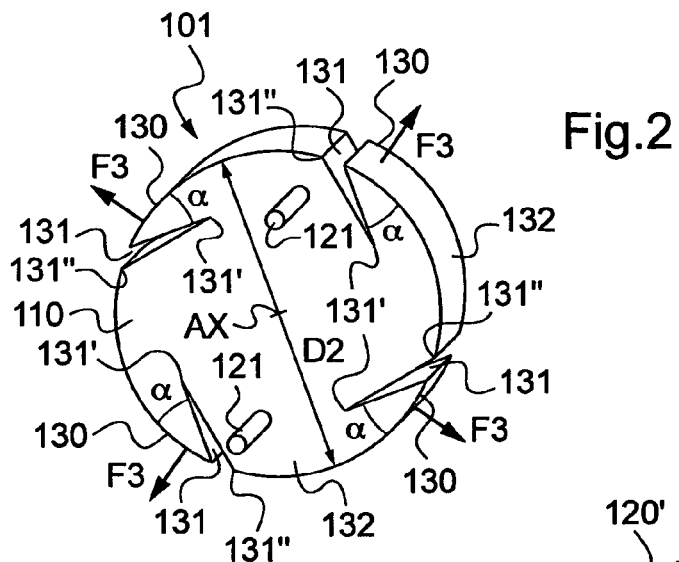
FIG. 2 is a diagrammatic isometric view of fastener tooling in a first embodiment.

With reference to FIG. 2, the first fastener tool 101 is a rim that is deformable by centrifugal forces.

More precisely, the centering means 110 of the first fastener tool 101 in a first embodiment is a disk having a plurality of slots 131 that are identical to one another, four slots in the example shown, each slot 131 passing through part of the centering means 110.

Thus, each slot 131 is a blind slot, with one end 131' of each slot 131 being closed while its other end 131" opens to the outside of the centering means, i.e. in the outer peripheral face 132 of the centering means 110.

In addition, since the centering means 110 comprise a disk, the centering means 110 present a profile that is circular. Each slot 131 is then disposed along a chord of the circular profile. Thus, the same acute angle α lies between each slot 131 and the outer peripheral face of the centering means 110.

Furthermore, in order to be suitable for being arranged inside the transmission shaft 1, the centering means presents an outside diameter D2 that is smaller than the inside diameter D1 of the free end 2 of the transmission shaft 1 into which it is to be arranged.

Furthermore, the first fastener tool 101 is provided with drive means 120 that co-operate with bores 4 of the transmission shaft 1. These bores 4 are already present in the transmission shaft and are used for connecting the transmission shaft 1 to another mechanical member, e.g. the turbine engine of a rotorcraft.

The drive means then possess at least one finger 121 secured to the centering means 110, and advantageously two fingers 121 that are arranged symmetrically on the centering means 110 about the axis of rotation AX.

When the first fastener tool 101, a rim, is to be fastened to the transmission shaft 1, the fingers 121 of the drive means pass through the bores 4 of the transmission shaft 1, with the centering means being located inside said transmission shaft 1.

The operator then makes use of washers 123 and bolts 122 on each finger 121 so that the front face 133 of the centering means is caused to press against the transmission shaft, the washers 123 being of the spring washer type so as to ensure sufficient pressure.

Advantageously, each bore 4 has a dimension, specifically its diameter, that is greater than the corresponding dimension of the finger 121 that is received. Consequently, the transmission shaft 1 is free to move radially relative to each finger 121, i.e. in the X,Y plane. This characteristic enables the transmission shaft to be positioned accurately.

Under such conditions, when the first fastener tool 101 is set into rotation about the axis of rotation AX, the drive means of the first fastener tool drive the transmission shaft in rotary motion.

As from a determined speed of rotation, e.g. lying in the range 2500 rpm to 6000 rpm, the centering means become clearly deformed by the centrifugal forces to which they are subjected. The edges 130 of the centering means overlying the slots 131 thus open under the effect of such centrifugal forces in the direction of arrows F3 so as to come into contact with the transmission shaft 1.

Since the slots 131 are distributed uniformly around the outer peripheral face 132 and since they are identical, the slots 131 also being symmetrical in pairs when the centering means 110 have an even number of slots, the edges 130 push against the first free end 2 of the transmission shaft, which then moves in such a manner that the centering means 110 becomes centered within the transmission shaft. The edges are identical in mass and they therefore move identically under the effect of centrifugal force.

It will be understood that the movement of the transmission shaft is made possible in particular by the fingers 121 of the drive means by virtue of the clearance that exists between each bore 4 and each of the fingers 121. Furthermore, the tightening of the bolts 122 is accurately set, in particular with the help of the washers 123, so as to allow such movements to take place.

Under these conditions, the positioning of the transmission shaft 1 prior to balancing is very easy, since it is performed automatically by the deformable centering means. Furthermore, this positioning is reproducible since the deformation of the centering means depends solely on the speed of rotation of the first fastener tool, which speed of rotation is easily controlled.

It should be observed that fastening the transmission shaft 1 to the first tool 101 may be made easier for the operator by fitting the balancing bench with at least one support means 5. The operator then places the transmission shaft 1 on the support means 5 and proceeds to fasten the first fastener tool 101 without needing to support the transmission shaft 1. Furthermore, the support means 5 position the transmission shaft 1 with a certain amount of accuracy and thus contribute actively to fastening said transmission shaft 1.

It should be observed that the support means 5 also provide safety in the event of an element breaking, more precisely in the event of a fastener tool breaking, for example.

When the first fastener tool 101 is fastened to the transmission shaft 1, the operator then moves the assembly comprising the second base 22', the second structure 20', the second drive shaft 10', and the second fastener tool 102 along arrow F2 so as to fasten the already-balanced transmission shaft 1 to the second fastener tool 102.

The second fastener tool 102 is designed as a second embodiment that is particularly well suited for the free ends of transmission shafts that present a ratio of bearing surface divided by diameter that is greater than 5%.

Consequently, the second fastener tool 102 is arranged inside the second free end 3 of the transmission shaft 1 by being fastened thereto with the help of centering means 110' and drive means 120'.

Figure 3:
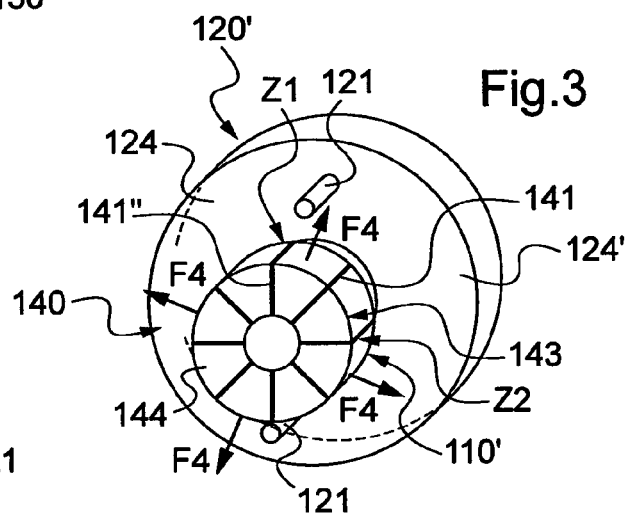
FIG. 3 is a diagrammatic isometric view of fastener tooling in a second embodiment.
Figure 4:
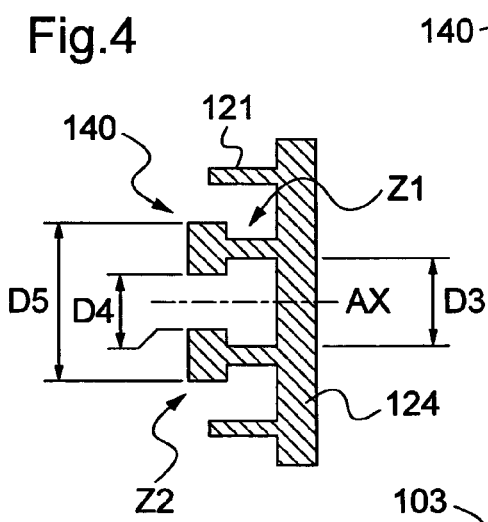
FIG. 4 is a diagrammatic section of the fastener tooling of the second embodiment.

With reference to FIGS. 3 and 4, the second fastener tool 102 is a rim that is deformable by centrifugal forces.

More precisely, the centering means 110' of the second fastener tool 102 forming a second embodiment of the invention is a hollow cylinder 140 with radial cuts, i.e. cuts along its own radii that extend part of the way therethrough so as to present a plurality of flyweights 143.

Thus, the hollow cylinder 140 has a plurality of radial grooves that are identical to one another and that are blind, one end 141' of each radial groove 141 being closed in an inner zone Z1 of the centering means 110' while the other end 141" opens to the outside of the centering means 110', i.e. to the outside face 144 of the centering means 110', in an outer zone Z2 of the centering means 110'.

Furthermore, the inner zone Z1 has a first inside diameter that is greater than the second inside diameter D4 of the outer zone Z2. The outer zone Z2 therefore presents mass greater than that of the inner zone Z1.

In order to be suitable for being arranged inside the transmission shaft 1, the centering means 110' also presents an outside diameter D5 that is smaller than the inside diameter D6 of the second free end 3 of the transmission shaft 1 into which it is to be arranged.

In addition, the second fastener tool 102 is provided with drive means 120' that co-operate with bores 4 of the transmission shaft 1.

The drive means then possesses at least one finger 121 secured to a cylindrical end plate 124 that is secured to the inner zone Z1 of the centering means 110', and advantageously two fingers 121 that are arranged symmetrically on the end plate 124 about the axis of rotation AX.

When the second fastener tool 102, a rim, is to be fastened to the transmission shaft 1, the fingers 121 of the drive means 120' pass through the bores 4 of the transmission shaft 1, the centering means 110' being located inside the transmission shaft 1.

The operator then uses washer 123 of spring washers type, and bolts 122 on each finger 121 so that the surface 124' of the end plate 124 presses against the transmission shaft 1.

Advantageously, each bore 4 has a dimension, specifically its diameter, that is greater than the corresponding dimension of the finger 121 that it receives. Consequently, the transmission shaft 1 is free to move radially relative to each finger 121, i.e. in the X,Y plane. This characteristic enables the transmission shaft to be positioned accurately.

Under such conditions, when the second fastener tool 102 is set into rotation about the axis of rotation AX, the drive means of the second fastener tool drive the transmission shaft in rotary motion.

As from a determined speed of rotation, e.g. lying in the range 2500 rpm to 6000 rpm, the centering means is clearly deformed by the centrifugal forces to which it is subjected. The flyweights 143 of the centering means 110' thus splay apart under the effect of centrifugal forces, along arrows F4, and they come into contact with the inside of the second free end 3 of the transmission shaft 1.

Since the radial grooves 141 are distributed uniformly on the hollow cylinder 140 and since they are identical, the grooves 141 also being symmetrical in pairs when the centering means 110' has an even number of them, the flyweights 143 move the first free end 2 of the transmission shaft in such a manner that the centering means 110' are centered inside the second free end 3 of the transmission shaft. All of the flyweights 143 have identical mass and they therefore move identically under the effect of centrifugal force.

Under such conditions, the transmission shaft 1 is very easily positioned prior to being balanced since positioning is performed automatically by the deformable centering means 110'. This positioning is also reproducible since the deformation of the centering means depends solely on the speed of rotation of the first fastener tool, which speed of rotation is easily controlled.

It can be understood that mounting and positioning the transmission shaft 1 on the balancing bench B is easy, fast, and completely under control, thus fully satisfying requirements.

Once the transmission shaft has been installed, the operator activates a motion generator 30 that set the first drive shaft 10 into rotation and thus set the first fastener tool 101 into rotation.

The tool in turn drives the transmission shaft 1 in rotation about the axis of rotation AX, thereby imparting this motion to the second fastener tool 102 and the second drive shaft 10'.

As from a given speed of rotation, the centering means 110, 110' deform and then position the transmission shaft 1 accurately by moving it radially.

Piezoelectric sensors 40 then come into action and transmit signals to the balancing means of the balancing bench B.

During this preliminary stage, the operator uses a reference transmission shaft 1 and if the balancing means find a balancing fault using conventional and known methods, then a fault relating to the fastener tools 101, 102 as such can be identified.

The operator then places masses on the fastener tools in order to balance them, and indexes the position of one of the fastener tools relative to the other.

At the end of this preliminary stage, the first and second fastener tools are thus balanced.

Thereafter, prior to each operation of balancing a new transmission shaft 1, the operator need do no more than index the positions of the fastener tools in the required manner, as measured during the preliminary stage.

Thereafter, the operator installs the transmission shaft for balancing on the bench, using the same procedure as that described above. Once the nominal speed of rotation is reached, i.e. the speed at which balancing is to be performed, the balancing means determine whether the operator does or does not need to retouch the transmission shaft in order to balance it. Since the fastener tools are already balanced, any out-of-balance measured by the balancing means necessarily implies that there is a balancing fault in the transmission shaft as such.

Figure 5:
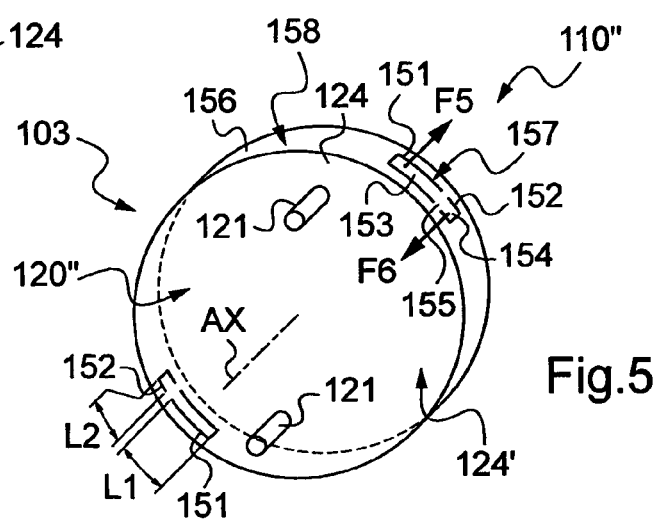
FIG. 5 is a diagrammatic isometric view of fastener tooling in a third embodiment.

FIG. 5 is a diagrammatic isometric view of a fastener tool 103 in a third embodiment, the fastener tool 103 being suitable for arranging outside the transmission shaft 1, unlike the first and second embodiments described above.

The fastener tool 103 has centering means 110" provided with a ring 156. The ring 156 then surrounds the free end of the transmission shaft, once installed.

In addition, the centering means 110" are provided with at least two flexible blades 157 that are distributed uniformly around the outer periphery of the ring 156.

The ring 156 is machined so as to present first and second U-shaped openings 151, with the concave sides of these first and second openings facing each other. Each flexible blade 157 is thus surrounded by a first opening 151 and a second opening 152, the first opening 151 representing the outline of a first portion 153 of the flexible blade 157 while the second opening 152 represents the outline of a second portion 154 of the flexible blade 157.

The first and second portions 153 and 154 are thus connected to the ring via a portion 155 that lies between the first and second openings 151 and 152. This portion 155 constitutes a kind of pivot about which the flexible blade can turn.

Furthermore, the first length L1 of the first portion 153 of the flexible blade 157 is longer than the second length L2 of the second portion 154 of said flexible blade 157. Thus, the first portion 153 is of greater mass than the second portion 154 of the flexible blade 157.

In addition, the third fastener tool 103 is provided with drive means 120" that co-operate with bores in the transmission shaft.

The drive means are identical to that of the second embodiment. Thus they comprise at least one finger 121 secured to a cylindrical end plate 124 secured to the ring 156, and advantageously two fingers 121 arranged symmetrically on the end plate 124 about the axis of rotation AX.

When the third fastener tool 103, a rim, is to be fastened to the transmission shaft 1, the fingers 121 of the drive means 120" pass through the bores 4 of the transmission shaft 1, the centering means being placed outside the transmission shaft 1.

The operator then uses spring-washer type washers 123 and bolts 122 on each finger 121 to cause a surface 124' of the end plate 124 to be pressed against the transmission shaft 1.

Advantageously, each bore 4 presents a dimension, specifically its diameter, that is greater than the corresponding dimension of the finger 121 that it receives. Consequently, the transmission shaft 1 is free to move radially relative to each finger 121, i.e. in the X,Y plane. This characteristic enables the transmission shaft to be positioned accurately.

Thereafter, when the third fastener tool 103 is set into rotation about the axis of rotation AX, as from a predetermined speed of rotation, e.g. lying in the range 2500 rpm to 6000 rpm, the centering means 110" deforms substantially. Under the effect of centrifugal forces, each flexible blade moves.

Since the first portion 153 of each flexible blade 157 is heavier than its second portion 154, it is the first portion 153 that moves away from the ring along arrow F5.

The flexible blade then turns about the pivot embodied by the portion 155 of the ring 156. Consequently, the second portion 154 of the flexible blade comes closer to the transmission shaft along arrow F6.

The various second portions 154 of the flexible blade 157 then press against the transmission shaft, which ends up by being centered inside the ring 156 of the centering means 110".

Finally, it should be observed that whatever the embodiment selected, the centering means of the fastener tool may be implemented using electrochemical machining. It then becomes possible to make the slots 131, the grooves 141, and the first and second openings 151 and 152 respectively in the first, second, and third embodiments at lower cost and in shorter time.

Naturally, the present invention may be subjected to numerous variations as to its implementation. Although several embodiments are described, it will readily be understood that it is not conceivable to identify exhaustively all possible embodiments. It is naturally possible to replace any of the means described by equivalent means without going beyond the ambit of the present invention.

For example, the balancing bench shown in FIG. 1 has first and second movable bases 22 and 22'. Nevertheless, it is possible to provide for the first base 22 to be stationary, while leaving the second base 22' axially movable. There is then no need to move the base that carries the motion generator 30, thereby facilitating operation.

What is claimed is:

1. A fastener tool for fastening a transmission shaft, the fastener tool being arranged at a free end of said transmission shaft, and said fastener tool being provided with centering means for centering the transmission shaft and with drive means for driving said transmission shaft in rotation, said centering means being deformable by centrifugal forces so as to come into contact with said transmission shaft as from a determined speed of rotation of said fastener tool about its axis of rotation.

2. A fastener tool according to claim 1, wherein said determined speed of rotation lies in the range from 2500 rpm to 6000 rpm.

3. A fastener tool according to claim 1, wherein said fastener tool is a rim.

4. A fastener tool according to claim 1, wherein said drive means are provided with at least one finger that co-operates with a bore formed in said transmission shaft in order to drive said transmission shaft in rotation about said axis of rotation.

5. A fastener tool according to claim 4, wherein said bore presents a dimension that is greater than the corresponding dimension of the finger so that said transmission shaft is capable of moving radially relative to a radius of said finger.

6. A fastener tool according to claim 4, wherein said drive means has two fingers arranged symmetrically about said axis of rotation.

7. A fastener tool according to claim 4, wherein said drive means comprises a cylindrical end plate secured to said centering means, said at least one finger being fastened to said end plate.

8. A fastener tool according to claim 1, wherein said centering means are arranged inside the transmission shaft.

9. A fastener tool according to claim 8, wherein said centering means comprise at least two partially-through slots each opening out into an outer peripheral face of said centering means.

10. A fastener tool according to claim 9, wherein said centering means are circular in profile and each slot is disposed along a chord of said profile, and wherein said slots are symmetrical in pairs about the center of said profile.

11. A fastener tool according to claim 9, wherein said slots are uniformly distributed around said outer peripheral face of said centering means.

12. A fastener tool according to claim 8, wherein said centering means comprise a hollow cylinder partially cut through radially so as to present a plurality of flyweights.

13. A fastener tool according to claim 12, wherein said cylinder has radial grooves that open out in a single outer face of said centering means.

14. A fastener tool according to claim 12, wherein said centering means are provided with an inner zone having a first inside diameter and secured to drive means, said centering means being provided with an outer zone having a second inside diameter and secured to said inner zone, said second diameter being smaller than said first diameter.

15. A fastener tool according to claim 1, wherein said centering means are arranged outside said transmission shaft.

16. A balancing bench for balancing a transmission shaft having first and second free ends, said balancing bench including balancing means for informing an operator whether said transmission shaft is well balanced, wherein the balancing bench includes two fastener tools according to claim 1 that are driven by a motion generator to set said transmission shaft into rotation, each fastener tool being arranged at a free end of said transmission shaft.

17. A fastener tool for fastening a transmission shaft, the fastener tool being arranged at a free end of said transmission shaft, and said fastener tool being provided with centering means for centering the transmission shaft and with drive means for driving said transmission shaft in rotation, said centering means being deformable by centrifugal forces so as to come into contact with said transmission shaft as from a determined speed of rotation of said fastener tool about its axis of rotation, wherein said centering means are arranged outside said transmission shaft, wherein said centering means comprise a ring of constant thickness including at least two flexible blades that are uniformly distributed relative to each other in the outer periphery of the ring.

18. A fastener tool according to claim 17, wherein said centering means include first and second U-shaped openings for defining each flexible blade, the concave sides of the first and second U-shaped openings facing each other.

19. A fastener tool according to claim 18, wherein the first opening is longer than said second opening.

20. A fastener tool for fastening a transmission shaft, the fastener tool being arranged at a free end of the transmission shaft, the fastener tool comprising:
a ring of constant thickness for centering the transmission shaft; and
a driver cooperating with the ring for driving the transmission shaft in rotation;
the ring being deformable by centrifugal forces so as to come into contact with the transmission shaft as from a determined speed of rotation of the fastener tool about its axis of rotation, wherein the ring is arranged outside the transmission shaft and includes at least two flexible blades that are uniformly distributed relative to each other in the outer periphery of the ring.

21. A fastener tool for fastening a transmission shaft, the fastener tool being arranged at a free end of the transmission shaft, the fastener tool comprising:
centering means for centering the transmission shaft; and
drive means for driving the transmission shaft in rotation, the centering means deformable by centrifugal forces so as to come into contact with the transmission shaft as from a determined speed of rotation of the fastener tool about its axis of rotation, wherein the drive means are provided with at least one finger that co-operates with a bore in the transmission shaft to enable the transmission shaft to be driven in rotation about the axis of rotation.

* * * * *